United States Patent [19]

Sgrignoli

[11] Patent Number: 5,699,011
[45] Date of Patent: Dec. 16, 1997

[54] DC OFFSET COMPENSATION METHOD AND APPARATUS

[75] Inventor: Gary J. Sgrignoli, Mt. Prospect, Ill.

[73] Assignee: Zenith Electronics Corporation, Glenview, Ill.

[21] Appl. No.: 691,480

[22] Filed: Aug. 2, 1996

[51] Int. Cl.⁶ .............................. H03D 1/00; H04L 27/08
[52] U.S. Cl. .......................... 329/350; 329/357; 375/317; 375/321; 455/204
[58] Field of Search .................... 329/349, 350, 329/357; 375/270, 277, 317–319, 321; 455/47, 204

[56] References Cited

U.S. PATENT DOCUMENTS

| | | | |
|---|---|---|---|
| 4,972,163 | 11/1990 | Van Der Plas | 329/350 X |
| 5,410,368 | 4/1995 | Krishnamurthy et al. | 348/726 |

Primary Examiner—David Mis

[57] ABSTRACT

A DC offset measurement and compensation circuit includes a switch arrangement for establishing a zero carrier condition in the circuit. The circuit output is integrated to develop any DC offsets, which are converted to analog form and subtracted from the signal output. A reference may also be subtracted to establish a base digital level for the output.

17 Claims, 1 Drawing Sheet

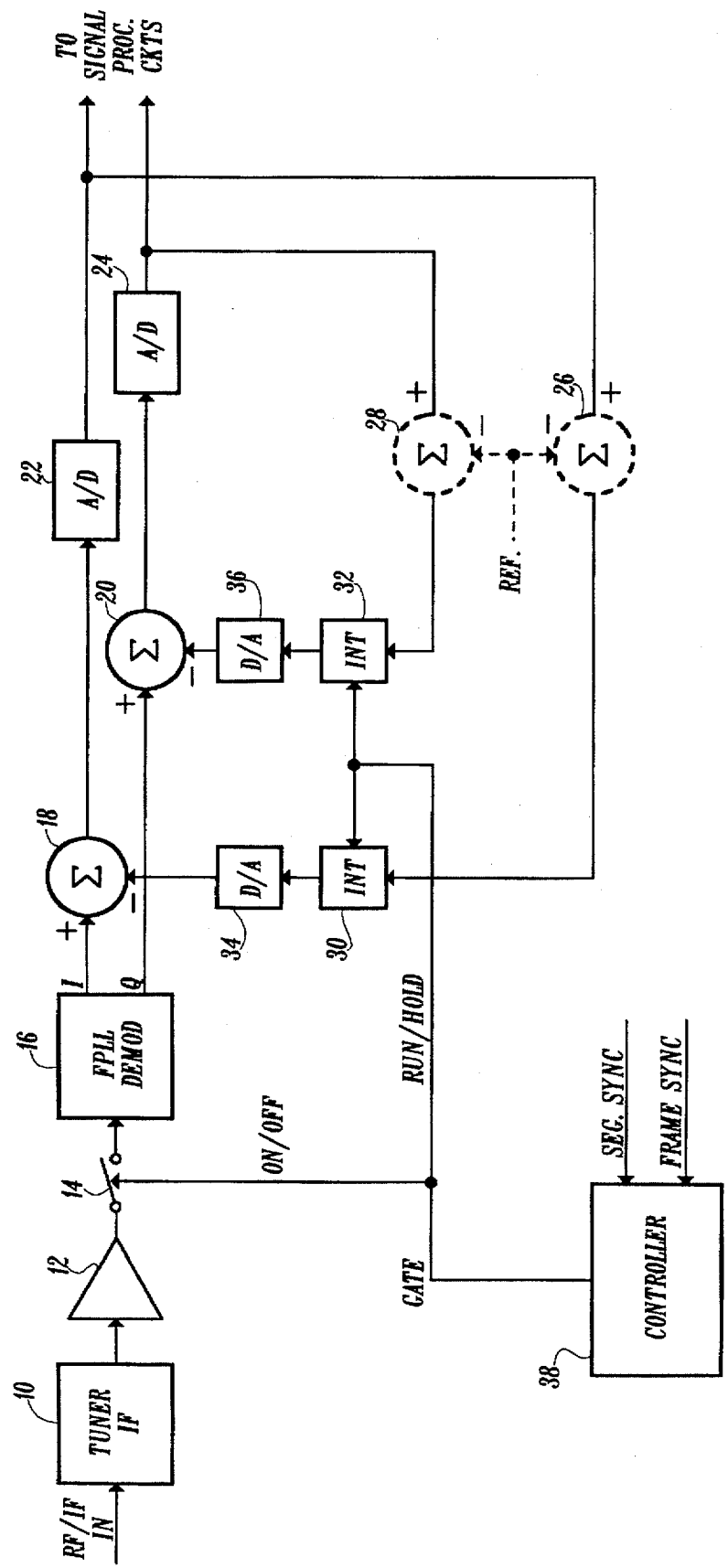

DC OFFSET COMPENSATION METHOD AND APPARATUS

BACKGROUND OF THE INVENTION AND PRIOR ART

This invention relates generally to apparatus for effecting DC offset compensation for baseband signals and particularly to such offset compensation for vestigial sideband (VSB) signals that employ a small pilot.

While the inventive system is applicable to many types of signal, it is of particular advantage in VSB signals that include a small in-phase pilot, in the form of a DC, for carrier recovery purposes. VSB receivers contain many subsystems such as demodulators for converting the RF/IF carrier signal to baseband. During processing, DC offsets (in addition to the DC resulting from the demodulated pilot) are often introduced in the baseband circuitry, such as the demodulator, baseband amplifiers and analog-to-digital (A/D) converters. These DC offsets can create problems in the signal processing circuits. For example, in an FPLL (frequency and phase locked loop) demodulator, static phase errors may be introduced. Also incorrect polarity detection of the lock-up phase may result. In A/D conversion, unsymmetrical headroom may result in clipping. The present invention provides a simple, readily implemented method of compensating for such DC offsets.

OBJECTS OF THE INVENTION

A principal object of the invention is to provide a novel method and apparatus for compensating DC offsets.

Another object of the invention is to provide an improved technique and apparatus for eliminating DC offsets in baseband circuits.

A further object of the invention is to improve DC offset performance in VSB signal systems that incorporate a pilot.

BRIEF DESCRIPTION OF THE DRAWING

These and other objects and advantages of the invention will be apparent upon reading the following description thereof in conjunction with the drawing, the single FIGURE of which is a partial block diagram illustrating the structure of the invention.

DESCRIPTION OF THE PREFERRED EMBODIMENT

DC offset compensation involves the accurate determination of the amount of the DC offset, if any, and removal of the DC offset from the baseband signal. In accordance with the invention, the DC offset is measured during a momentarily produced zero carrier condition. The zero carrier condition is produced by "opening a switch" for the RF/IF signal. The baseband output signal level is at its zero RF/IF value when the switch is open and its demodulated DC level is at zero. Any DC that is present in the baseband output at that time is due to DC offsets in the circuitry. With the invention, the DC offset is removed from the output signal.

The VSB digital data signal is bipolar, that is, it travels above and below a "zero carrier" level by an almost equal amount, the difference being due to the DC shifted value of the pilot. As mentioned, the small DC produced by demodulation of the pilot is very important in carrier recovery and it is also of importance in determining the lock-up polarity of the FPLL demodulator that is preferably used in the VSB receiver due to its desirable frequency and phase locking characteristics. DC offsets can seriously interfere with the pilot recovery and polarity determination circuits of the FPLL demodulator.

Referring to the drawing, an RF/IF input signal is supplied to a tuner/IF block 10 where the received RF signal is heterodyned to an IF frequency. The IF signal is applied to a buffer amplifier 12 which feeds a switch 14 that is connected in series between the amplifier 12 and an FPLL demodulator 16. Switch 14 is shown as a mechanical single pole device for illustrative purposes only; those skilled in the art will readily perceive alternate electronic arrangements. FPLL 16 produces an I output signal and a Q output signal, each of which is supplied to one input of respective adders 18 and 20, respectively. The outputs of adders 18 and 20 in turn supply a pair of A/D converters 22 and 24, respectively, whose digital signal outputs are coupled to signal processing circuits (not shown). Another pair of adders 26 and 28 are shown in dotted lines for the purpose of subtracting a reference, if desired, from the digital signals. A common reference voltage may be connected to the negative inputs of adders 26 and 28. A/Ds 22 and 24 supply integrators 30 and 32, respectively, which are in turn coupled, via a pair of D/A converters 34 and 36, to the negative inputs of adders 18 and 20, respectively. A controller 38 is supplied with segment sync and frame sync signals from well known means (not shown) and develops a gate signal. The gate signal is applied to switch 14 and to integrators 30 and 32 to control their operation.

In operation, with switch 14 closed, the RF/IF signal is demodulated by FPLL 16 and supplied, through adders 18 and 20 to A/D converters 22 and 24, respectively. In the case of a VSB signal with a pilot, the signal output of A/D 22 will consist of data and a small DC corresponding to the demodulated pilot. The output may also include a DC offset due to the processing circuitry, which DC offset is undesirable since it contaminates the demodulated pilot and upsets the data levels. The Q output adder 20 does not contain data or the DC pilot, but will reflect any DC offsets introduced by the processing circuitry.

Ignoring the dotted line adders 26 and 28, the outputs of A/Ds 22 and 24 are supplied to integrators 30 and 32, respectively, but have no effect since the integrators are disabled at this time (when switch 14 is closed). Therefore the circuits just described do not affect the output signals from A/Ds 22 and 24.

Assume now that switch 14 is open. The RF/IF signal is interrupted and a condition corresponding to zero carrier is established at the input of switch 14. After a predetermined amount of settling time, the effects of the zero carrier are noticed at integrators 30 and 32. By definition, zero carrier means no DC pilot or data. The FPLL 16 outputs do not contain the DC pilot or any data and the outputs of A/Ds 22 and 24 only include locally produced baseband DC offsets. These are integrated since the integrators 30 and 32 are also enabled by the gate signal that controls switch 14. The integrated values are converted to analog form by D/As 34 and 36 and subtracted from the analog signal outputs of FPLL 16 via adders 18 and 20, respectively. The D/A values of the integrated signals determined when switch 14 is open are held by well known means (not shown) until the next opening of switch 14 and measurement/correction of the DC offset is made. Thus the measured DC offset produced by the circuitry is subtracted from the output signals from the FPLL demodulator.

Assuming that the D/A converters are operated at the same high speed sample rate as the A/D converters, complete DC offset correction can be achieved with the short time that the switch 14 is open. This minimizes the time the received VSB signal is not present. If the D/A converters are sampled once per operation of switch 14, the DC offset correction will still be achieved, but at a slower rate. The gating of the integrators must, of course, take into account any delays in the RF/IF, baseband and A/D converter circuits to assure that the DC measurement and subtraction are performed at the appropriate times.

Reverting to the reference applied to adders 26 and 28, it may be selected to provide any digital value, which value is subtracted prior to the integration and while fully compensating for the DC offset bases the zero carrier level at the selected digital value. Of course, the "zero carrier" digital reference can also be selected to be any value other than zero.

Those skilled in the art will note that switch 14 can be opened during the VSB framing code, which contains portions that are not used by most receivers (e.g. reserved bytes or the three 64 symbol pseudo random number sequence codes). It will also be noted that, since the DC offsets generally do not change rapidly with time, switch 14 need not be opened every framing code, but may be opened much less frequently (e.g. every 8th or 16th framing code) depending upon the environment. It will also be noted that both the I and the Q outputs of FPLL 16 need not be processed, the I channel generally sufficing for most applications. However, for applications where the Q output is important, it may be treated for DC offset compensation as described above.

What has been described is a novel DC offset compensation method and apparatus that is simple and effective. It is recognized that numerous changes in the described embodiment of the invention will occur to those skilled in the art without departing from its true spirit and scope. The invention is to be limited only as defined in the claims.

What is claimed is:

1. A method of compensating for DC offsets in a signal comprising:

demodulating an RF signal;

converting the demodulated RF signal to a digital signal;

determining the DC content of the digital signal under a zero RF carrier condition; and subtracting the determined DC content from the demodulated RF signal.

2. The method of claim 1 wherein the determining step comprises:

removing the RF signal during preselected times; and integrating the digital signal during the preselected times.

3. The method of claim 2, further comprising:

providing a switch for disconnecting the RF signal during the preselected times; and converting the integrated digital signal to an analog signal corresponding to the determined DC content.

4. The method of claim 3, further comprising:

adjusting the subtracted DC content with a reference.

5. The method of claim 3 wherein an FPLL demodulator provides I and Q demodulated output signals and wherein said converting, integrating and subtracting steps are performed for both the I and the Q output signals.

6. The method of claim 4 wherein the reference is selected to produce a desired digital level in the digital signal.

7. A method of compensating for DC offsets in a signal comprising:

demodulating an RF signal;

converting the demodulated RF signal to a digital signal;

removing the RF signal during a preselected time to produce a zero carrier condition;

integrating the digital signal during the zero carrier condition;

converting the integrated signal to an analog signal; and combining the analog signal with the demodulated signal.

8. The method of claim 7, further comprising:

adjusting the digital signal with a reference.

9. The method of claim 8 wherein the reference is selected to produce a desired digital level in the digital signal.

10. The method of claim 7 wherein the FPLL produces I and Q output signals and wherein the removing, integrating, converting and combining steps are performed for both the I and Q output signals.

11. A DC offset compensation circuit comprising:

means for receiving and demodulating a carrier signal and developing an analog baseband signal therefrom;

means for converting said analog baseband signal to a digital signal;

means for determining the DC content of said digital signal under a zero carrier condition; and means for subtracting said DC content from said analog baseband signal.

12. The circuit of claim 11 wherein said determining means comprises:

means for integrating said digital signal during said zero carrier condition.

13. The circuit of claim 12, further comprising:

means for producing said zero carrier condition during preselected times and for enabling said integrating means during said preselected times.

14. The circuit of claim 12, further including:

switching means for establishing said zero carrier condition at preselected times; and means for enabling said integrating means during said preselected times.

15. The circuit of claim 14, further including a reference for adjusting said digital signal during said preselected times to a desired digital level.

16. The circuit of claim 15, further including an FPLL demodulator and wherein said carrier signal includes a pilot, said pilot developing a DC level in the output of said FPLL demodulator.

17. The circuit of claim 16, wherein said FPLL produces I and Q output signals and wherein said means for converting, said means for integrating and said means for subtracting operate on both said I and Q output signals.

* * * * *